United States Patent
Carbonini (10) Patent No.: US 7,621,212 B2
(45) Date of Patent: Nov. 24, 2009

(54) PISTON FOR A BEVERAGE INFUSION AUTOMATIC MACHINE

(75) Inventor: Carlo Carbonini, Villastanza di Parabiago (IT)

(73) Assignee: Rancilio Macchine per Caffe' S.p.A., Villastanza di Parabiago (MI) (IT)

( * ) Notice: Subject to any disclaimer, the term of this patent is extended or adjusted under 35 U.S.C. 154(b) by 609 days.

(21) Appl. No.: 11/023,423

(22) Filed: Dec. 29, 2004

(65) Prior Publication Data

US 2005/0150389 A1    Jul. 14, 2005

(30) Foreign Application Priority Data

Jan. 9, 2004    (EP)    .................................    04425007

(51) Int. Cl.
*A47J 31/34*    (2006.01)

(52) U.S. Cl. ...................... 99/302 P; 99/297

(58) Field of Classification Search ............... 99/302 P, 99/287, 297, 289 R, 302 R; 92/247, 205, 92/201, 194, 181 R, 173, 172

See application file for complete search history.

(56) References Cited

U.S. PATENT DOCUMENTS

| 1,002,173 | A | * | 8/1911 | Naegelen | ................ | 92/205 |
| 1,523,986 | A | * | 1/1925 | Schmidt | ................ | 92/205 |
| RE18,820 | E | | 5/1933 | Olson | | |
| 1,921,996 | A | * | 8/1933 | Hooydonk | ................ | 92/206 |
| 2,004,618 | A | | 6/1935 | Schmidt | | |
| 2,157,039 | A | * | 5/1939 | Hooydonk | ................ | 92/206 |
| 2,409,764 | A | | 10/1946 | Jessup | | |
| 2,961,278 | A | * | 11/1960 | Newhall | ................ | 92/206 |
| 4,796,521 | A | * | 1/1989 | Grossi | ................ | 99/287 |
| 6,634,280 | B2 | * | 10/2003 | Sowden et al. | ............. | 99/302 P |
| 7,017,474 | B2 | * | 3/2006 | Comte | ................ | 99/302 P |

* cited by examiner

*Primary Examiner*—Reginald L Alexander
(74) *Attorney, Agent, or Firm*—Bacon & Thomas, PLLC (57) ABSTRACT

A piston (11) of an automatic machine for infusion of beverages, such as coffee and the like, the piston having a piston head (13*a*, 13*b*) divided into two parts connected together and axially movable relative to each other, an annular gasket (15) being housed between those parts and radially expanding when an axially directed thrust such as to make said two piston parts (13*a*, 13*b*) approach each other is applied onto said piston (11), wherein the elastic resistance of said gasket (15) keeps said two piston parts (13*a*, 13*b*) spaced apart when no axial thrust is applied onto the piston.

20 Claims, 5 Drawing Sheets

PISTON FOR A BEVERAGE INFUSION AUTOMATIC MACHINE

BACKGROUND

The present invention relates to the field of automatic infusion making machines, in particular for making espresso coffee, and more particularly it concerns a piston for the infusion assembly in one such machine.

It is known that, for making espresso coffee and other beverages, automatic machines are used, which internally contain a set of components allowing an operator, by simply pressing a push-button, to make the machine perform a group of operations, in a predetermined sequence, until the espresso coffee infusion is directly delivered into a cup. Essentially, such operations are: grinding the exact amount of coffee grains, accumulating the ground coffee powder in a suitable chamber, compacting and compressing the coffee powder until forming a "tablet" with predetermined compactness and size, sending a dosed water flow at a predetermined temperature through said tablet, collecting and sending the coffee infusion downstream the powder tablet towards a group of ducts and from said ducts towards the cup, and ejecting the exhausted powder tablet towards a suitable container.

The mechanical and thermal wear the components of such a machine undergo during the operating cycle is made more severe by the extreme aggressiveness, from both the chemical and the mechanical standpoint, of the coffee powder obtained by grinding the grains.

From the chemical standpoint, indeed it is known that, during the operating cycle, the oil substances contained in toasted coffee are spontaneously released, mainly because of the high temperatures that are required to produce and maintain at about 90° C. the water necessary for delivery. From the mechanical standpoint, as known, abrasiveness of the ground coffee powder is high as a consequence of the toasted grain hardness and of the very fine grinding granulometry.

Therefore, automatic machines for making espresso coffee are to be submitted to periodical maintenance operations, with repair and replacement of the worn parts.

Different solutions have been adopted in the art to contrast the above-mentioned aggressiveness, by choosing more resistant materials and/or by various surface treatments, capable of protecting the surfaces in contact with the coffee powder.

Greater difficulties have been on the contrary experienced in dealing with the problem of the coffee powder abrasiveness, especially in respect of those components which are to ensure a perfect hydraulic tightness in the different operations during coffee powder infusion and which are therefore to keep their mechanical integrity.

Among those components, of particular importance is the gasket mounted onto the pistons which are to compact the tablet of ground coffee, to compress it in the infusion chamber, to keep a constant tightness of the chamber while pressurised hot water is being pumped for the coffee infusion, and lastly to convey the exhausted tablet outside the infusion chamber for evacuation.

Figure 1:
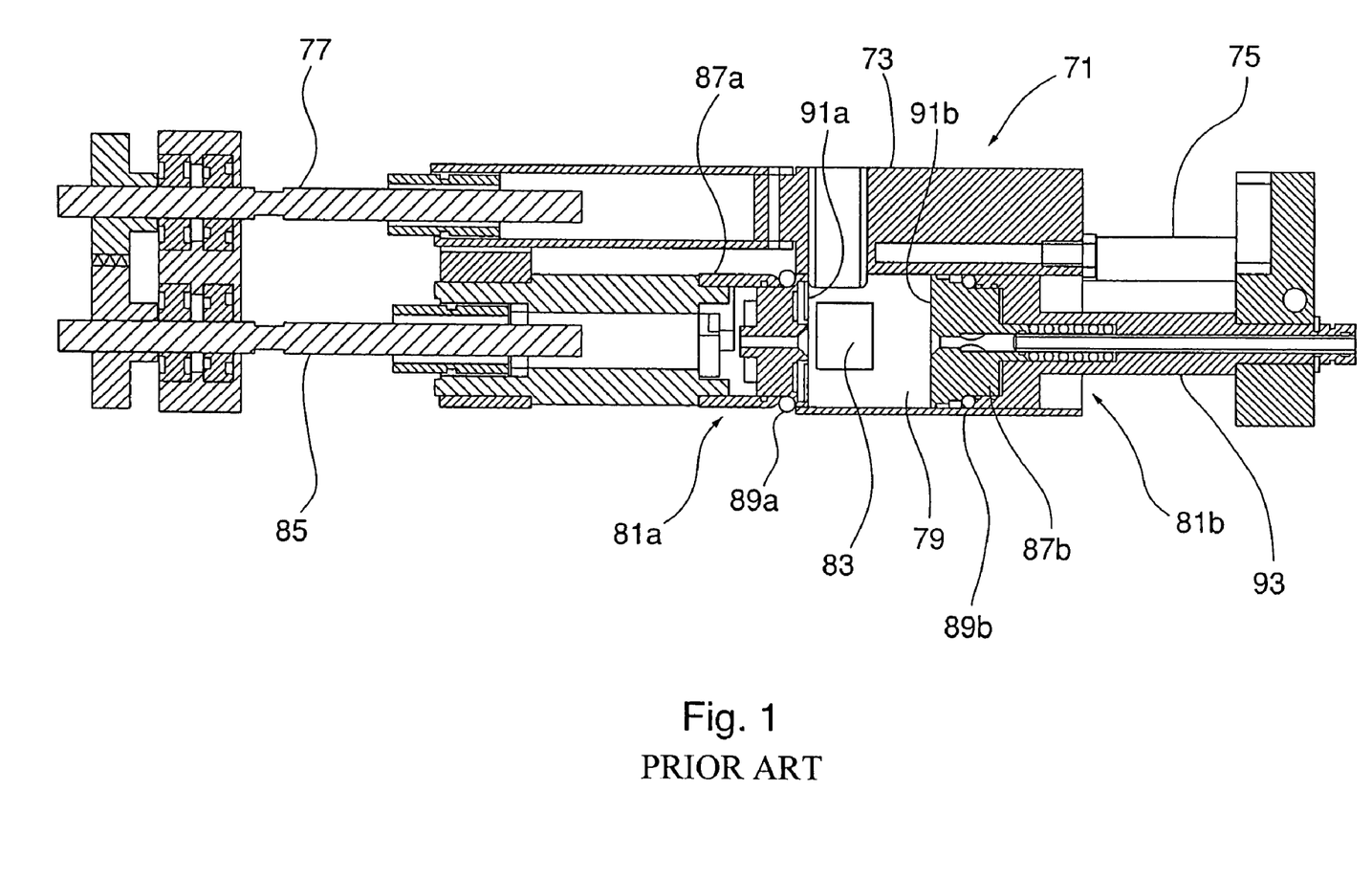
FIGS. 1 and 2 are longitudinal sectional views of an infusion assembly and a piston, respectively, according to the prior art.

Referring to FIG. 1, there is shown an infusion assembly of a prior-art coffee making machine, as disclosed for instance in EP-A-1260166. Said infusion assembly, generally denoted by reference numeral 71, comprises a horizontally moving chamber 73, sliding on guides 75 and driven by a threaded shaft 77. The chamber has an internal cavity 79, intended to receive the dose of coffee powder or other powdered substance. A first piston 81a, also horizontally moving, and a second stationary piston 81b, facing the first piston, co-operate with said moving chamber 73. Said moving chamber 73 has ducts 83 for introducing coffee powder or other powdered substance into cavity 79. Also moving piston 81a is slidably mounted on guides, and it is driven by a shaft 85 co-operating with shaft 77 driving moving chamber 73, in such a manner that moving chamber 73 and moving piston 81a are simultaneously translated in opposite directions. Moving piston 81a has a head 87a, which can fit into infusion chamber 73. Hydraulic tightness between said head and said chamber is ensured by an O-ring 89a. Said head 87a is equipped at its free end with a disc-shaped filter 91a for the coffee and it has an axial duct 26 for introducing hot water, supplied through tubes not shown. Stationary piston 81b has a head 87b equipped with a disc-shaped filter 91b for the coffee and an O-ring 89b for hydraulic tightness with infusion chamber 73. The piston is integral with a rod 93 having an axial duct intended to convey the prepared infusion outside infusion assembly 71.

During the operation cycle of the infusion assembly, chamber 73 and moving piston 81a are translated relative to each other in order to pass from a phase of coffee powder loading to a compression and infusion phase and from the latter to a phase of used coffee ejection. In the loading phase, moving chamber 73 and moving piston 81a are in such a position that cavity 79 forms an infusion chamber closed by heads 87a, 87b of pistons 81a, 81b, and the coffee powder dose can be introduced through ducts 83. Once the desired coffee dose has been introduced, the coffee powder compaction and compression phase is performed, by actuating shafts 77, 85 so that said chamber 73 and said moving piston 81a are translated by such an extent that heads 87a, 87b are brought to the minimum possible distance, and by compressing said powder between said heads. Under such conditions, the machine is ready for the introduction of infusion water. Hot water is introduced into cavity 79 through filter 91a and the infusion then flows out through filter 91b. At the end of the percolation time, shafts 77, 85 are again actuated, but in reverse directions with respect to the compression phase, thereby spacing apart heads 87a, 87b of the pistons. When shafts 77, 85 reach the end of that new displacement, infusion assembly 71 is in the condition of coffee ejection, in which cavity 79 is open on the side if moving piston 81a and the used coffee is ejected thanks to the thrust of stationary piston 81b due to the backward movement of moving chamber 73 towards said stationary piston 81b.

Several solutions have been developed in the past to limit the O-ring wear, in particular in the piston moving into and out of the infusion chamber at each operating cycle.

According to prior art solutions, the piston head is formed in two parts and the O-ring is located between said parts, so that only when the two piston parts approach each other an O-ring expansion takes place such that O-ring sealingly adheres to the infusion chamber wall. Examples of such solutions can be found in CH570145, EP0608805 and FR2202668.

Figure 2:
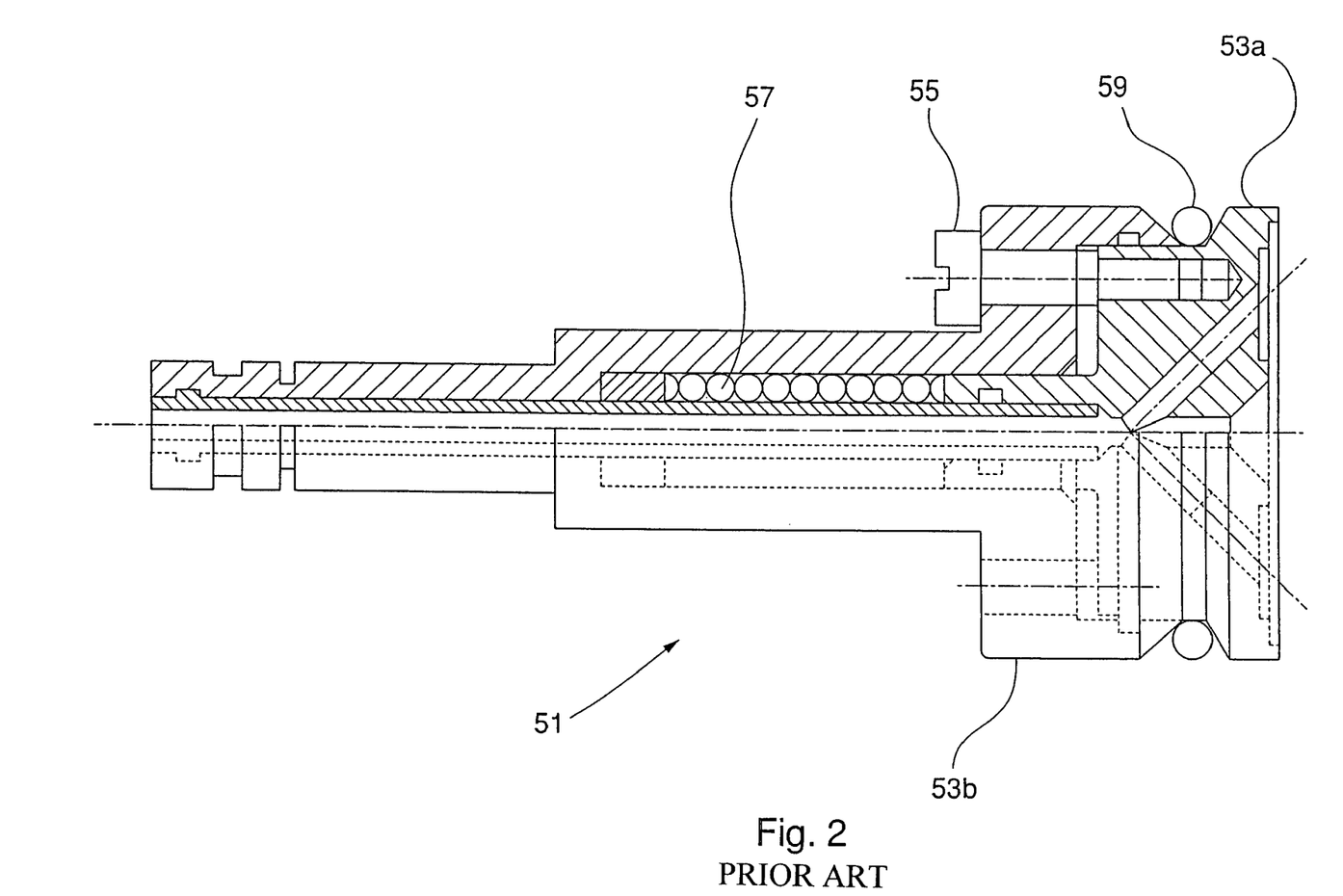

Another example of two-part piston according to the prior art is denoted by reference numeral 51 in FIG. 2.

In the illustrated example, piston 51 has a head divided into two parts 53a, 53b kept joined by retaining screws 55. A spring 57 is located between the two piston parts 53a, 53b so as to keep the two piston parts spaced apart and to allow them to approach each other only when the compression force exerted by the piston on the coffee powder exceeds the elastic resistance of the spring. An O-ring 59 is located between the two piston parts 53a, 53b in an annular groove defined by an internal cylindrical abutment and by two facing conical abutments. When the piston is in idle condition, O-ring 59 lies upon cylindrical abutment 59 and has an external circumference with substantially the same diameter as piston 51. As the two piston parts move towards each other, the two facing conical abutments cause O-ring 59 to expand towards the outside and press it against the wall of the infusion chamber.

The prior art solutions have a number of drawbacks.

First of all, constructing the piston head by using a plurality of telescopic members results in an increase of the number of components and requires using additional gaskets to ensure the hydraulic tightness between such components, in order to avoid seepage into the piston.

Moreover, the proposed arrangements do not prevent all or part of the individual components from undergoing contact with water during the infusion phase and consequently from undergoing a continuous deposition of oil substances released by the coffee powder. With continuing use, the constant accumulation of said substances entails an increased friction between the individual parts, which may lead to system blockage and consequent damages to the O-ring, until a complete breaking thereof.

SUMMARY

It is the main object of the present invention to overcome the above drawbacks, by making a piston for a beverage infusion machine that is of simple construction and that is made of a limited number of components.

It is another object of the present invention to make a piston in which the wear of both the mechanical piston parts and the sealing gasket associated therewith is reduced.

It is a further object of the present invention to make a piston for an infusion assembly in which the components are protected from infusion water seepage, so as to avoid the accumulation of oil substances released by the coffee powder.

The above and other objects are achieved by a piston for an infusion assembly of a coffee-making machine as described herein.

According to the invention, the above objects are achieved by using a single gasket that ensures tightness between the piston and the internal wall of the infusion chamber during the phases of compression and infusion of the coffee tablet and that, at the same time, opposes an elastic resistance to the relative movement of the two piston parts, keeping them spaced apart when the piston is not compressed against the coffee powder.

Thus, it is possible to avoid using springs between such elements, thereby making the piston structure simpler.

Advantageously, according to the invention, said gasket further ensures tightness between the two piston parts during the whole operating cycle of the infusion assembly, as well as during the periods in which said assembly is not operating.

Thanks to such a gasket, the use of additional seals can therefore be avoided, thereby further reducing the number of components.

Advantageously, said gasket undergoes a strong compression only during the phases of compression and infusion of the coffee tablet, whereas during the remaining phases of the operation cycle of the infusion assembly, as well as during the periods in which said assembly is not operating, the only stress said gasket undergoes is the light compression necessary to ensure the tightness between the piston members, so that the wear of said gasket is significantly reduced.

BRIEF DESCRIPTION OF THE DRAWINGS

An embodiment of the piston for an infusion assembly according to the invention will be now described by way of non-limiting example, with reference to the accompanying drawings, in which.

DETAILED DESCRIPTION

Figure 3A:
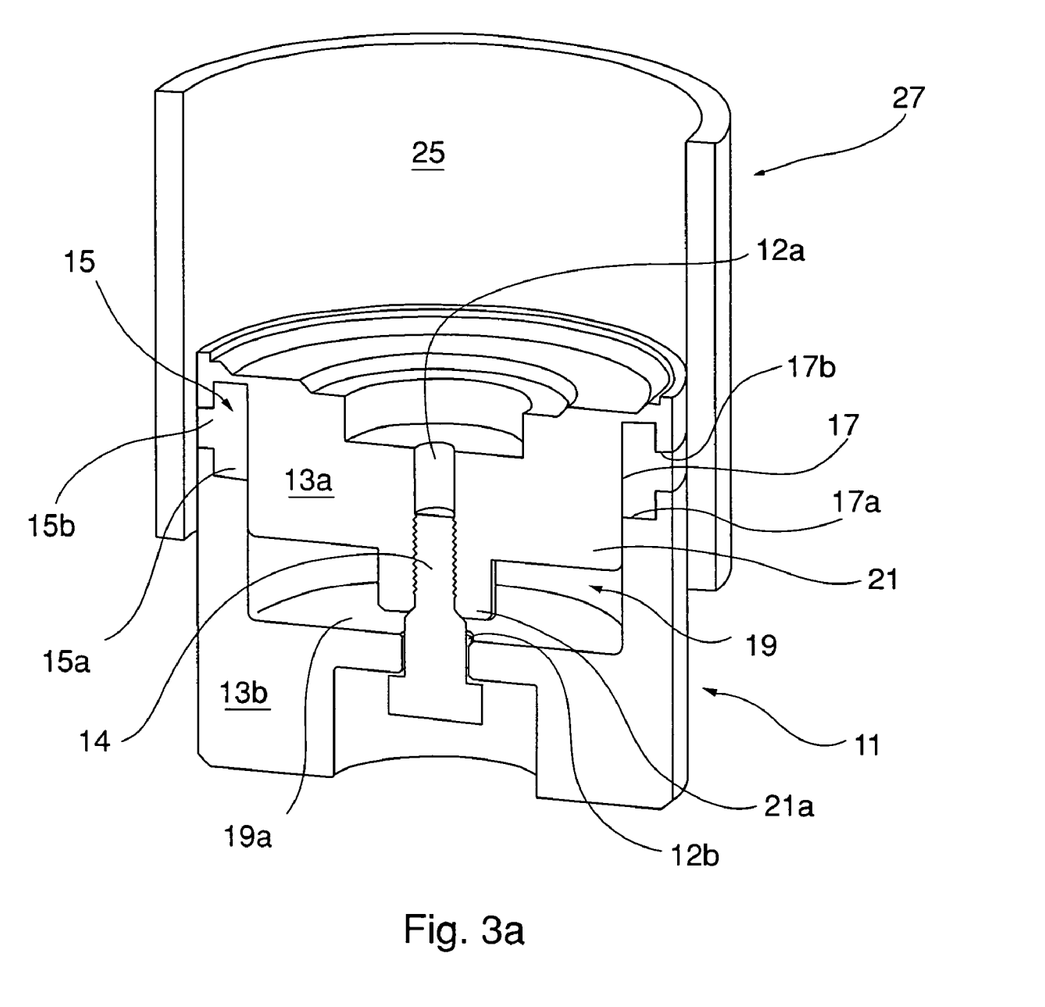
FIGS. 3a and 3b are perspective sectional views of a piston according to the invention, in idle and compression conditions, respectively.
Figure 3B:
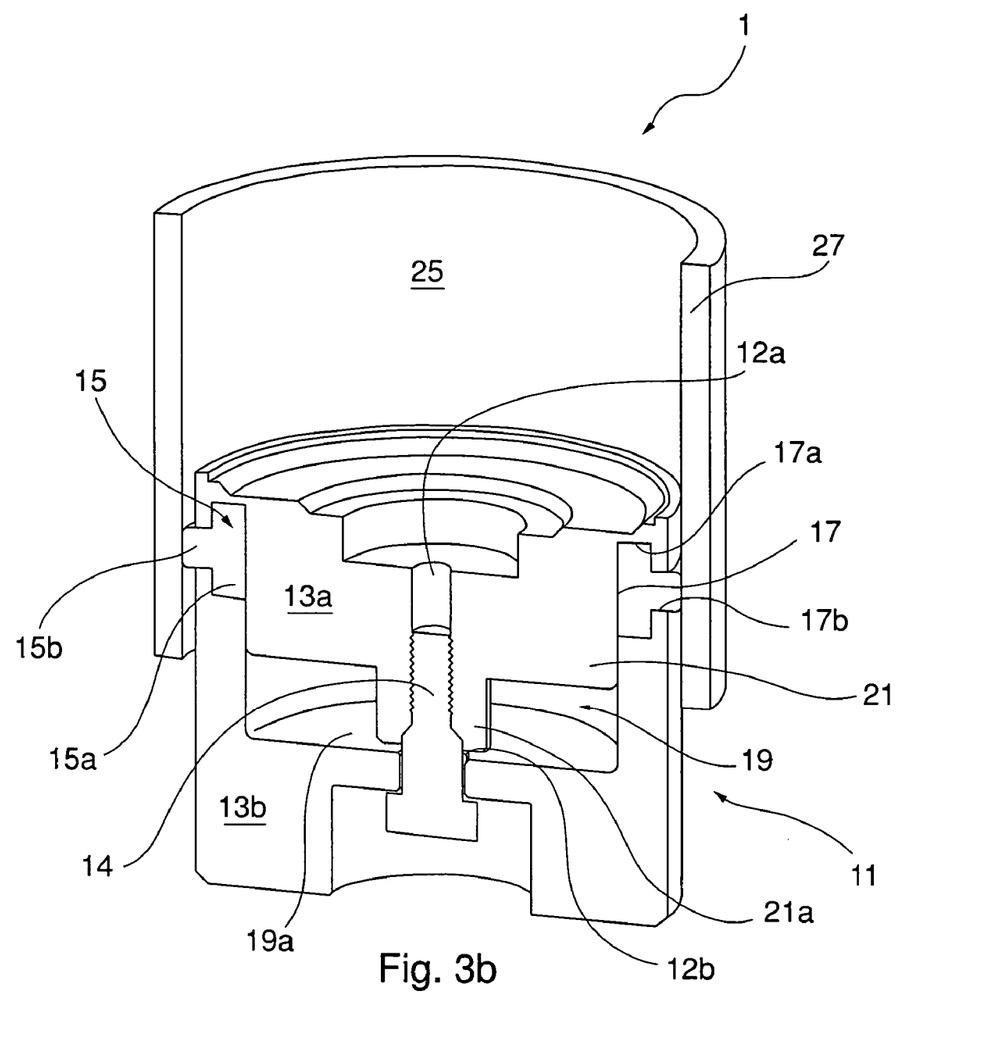

Referring to FIGS. 3a and 3b, there is shown a piston 11 of an automatic machine for beverage infusion, for instance for making espresso coffee, which piston comprises a piston head divided into two parts 13a, 13b, connected to each other and axially displaceable relative to each other.

An annular gasket 15 is located between the two piston parts and radially expands when an axial thrust such as to cause said two piston parts 13a, 13b to approach each other is applied to said piston 11.

Advantageously, according to the invention, the elastic resistance of said gasket 15 keeps said two piston parts 13a, 13b spaced apart when no axial thrust is applied to said piston 11, without the need to provide a spring or other resilient means between said two piston parts.

According to the invention, when no axial thrust is applied to said piston 11, said gasket 15 lies within the diameter of said two piston parts 13a, 13b (FIG. 3a). On the contrary, when an axial thrust is applied to said piston 11 in order to cause said two piston parts 13a, 13b to approach each other, said gasket projects outside said diameter (FIG. 3b).

Thus, tightness of gasket 15 against internal wall 25 of infusion chamber 27 is ensured when the piston exerts a compression onto the coffee powder, and the piston can move into and out of chamber 27 and slide within the latter without any rubbing of gasket 15 against wall 25 of said infusion chamber.

Always according to the invention, gasket 15 ensures liquid tightness between said two piston parts 13a, 13b both when said piston is in idle condition, i. e. it is not submitted to an axial thrust, and when said piston exerts a compression onto the powder from which the infusion is to be extracted, i.e. when the piston is submitted to an axial thrust causing said two piston parts 13a, 13b to approach each other.

According to the invention, a circumferential seat 17 receiving said annular gasket 15 is formed between said two piston parts 13a, 13b. An internal zone 17a, intended to retain and axially compress gasket 15, and an external zone 17b, communicating with said internal zone 17a and intended to allow radial expansion of gasket 15 towards the outside of piston 11, are defined in said seat 17.

Preferably, seat 17 has a T-shaped section, in which the crossbar of the "T" and the stem of the "T" correspond with said internal and external zones 17a, 17b, respectively. Correspondingly, said gasket 15 also has a T-shaped section, in which internal portion 15a, corresponding with the crossbar of the "T", is housed in said internal zone 17a of said seat 17, and external portion 15b, corresponding with the stem of the "T", is housed in said external zone 17b of said seat 17 and can freely radially expand towards the outside of said seat 17 when said gasket 15 is axially compressed.

Preferably moreover the tolerances between the walls of internal zone 17a and gasket 15 are so determined that innermost portion 15a of said gasket is submitted to a stronger axial compression, whereas outermost portion 15b undergoes a lower stress, so as to facilitate its outward radial expansion, i.e. towards wall 25 of infusion chamber 27. However, seat 17 could be even made so that said gasket 15 is axially compressed in uniform manner, without thereby affecting the good operation of the piston according to the invention.

In the illustrated embodiment, said two piston parts 13a, 13b comprise a first, outer piston part 13a intended to compress the powder for the infusion of said beverage, and a second, inner piston part 13b. Said second piston part 13b in turn comprises an axial cavity 19 receiving a portion 21 of said first piston part 13a. Said piston portion 21 is slidable in said axial cavity 19 when an axial thrust is exerted onto piston 11, i.e. during the compression phase of the beverage powder, e.g. coffee powder, and when said thrust is released, i.e. in the phase in which the piston is moving away from the infusion chamber.

According to the invention, said two piston parts 13a, 13b are kept spaced apart thanks to said gasket 15 only and said two piston parts 13a, 13b are always kept axially spaced apart during the whole operating cycle of the piston.

Referring to a coffee-making machine, the operation of the piston according to the invention is as follows.

When coffee delivery is requested, after an initial loading phase of the coffee powder into infusion chamber 27, thanks to the relative displacement of infusion chamber 27 and piston 11, piston 11 begins penetrating into chamber 27, and collects the coffee powder and compacts it until a point where the compression phase of the tablet formed by said powder starts. By continuing the thrust, piston parts 13a, 13b tend to approach each other, by overcoming the elastic resistance of gasket 15. As a result of that movement, gasket 15 is made to expand in the only possible direction, i.e. in radial direction towards the outside of seat 17, towards wall 25 of infusion chamber 27, until arriving in contact with said wall. In such manner, said gasket 15 ensures hydraulic tightness between piston 11 and wall 25 of said infusion chamber 27 as long as the gasket undergoes compression between said two piston parts 13a, 13b.

Once the infusion phase is over, the relative displacement of piston 11 and infusion chamber 27 brings piston 11 back to the idle condition, and the elastic force due to axial expansion of gasket 15 moves again the two piston parts 13a, 13b away from each other. Gasket 15 returns into seat 17 and takes again a diameter lower than that of the internal cavity of chamber 27 and substantially identical to that of piston 11.

Preferably, according to the invention, when the maximum axial thrust is applied to the piston, i.e. at the end of the compression phase on the powder from which the beverage infusion is to be obtained, base 21a of part 13a of piston 11 does not abut against bottom 19a of cavity 19 in part 13b of piston 11, but it remains always spaced apart therefrom. Such a feature allows recovering the wear of gasket 15 that unavoidably occurs in time. Yet, it is also possible to make base 21a contact bottom 19a of cavity 19 during compression of gasket 15, without thereby affecting the good operation of the piston according to the invention.

Advantageously, according to the invention, gasket 15, besides ensuring tightness between piston 11 and wall 25 of infusion chamber 27 while the piston is compressing the beverage powder, also ensures tightness between parts 13a, 13b forming the head of piston 11. Such second sealing function is exerted not only during the compression and infusion phases, but also during the whole operating cycle of the infusion assembly, as well as during the periods in which said assembly is not operating. In this manner, use of additional internal gaskets can be dispensed with, and the piston structure is simplified.

Advantageously moreover, the only stress gasket 15 undergoes while the piston is in idle condition is the light compression necessary to ensure the tightness between piston parts 13a, 13b. Consequently, the wear of said gasket is significantly reduced.

In the illustrated embodiment, said permanent light compression is obtained through a connecting means 14 (e.g. a screw) passing through central axial bore 12a, 12b formed in both piston parts 13a, 13b. Said screw 14 allows keeping the two piston parts connected together while maintaining a light compression onto gasket 15.

It is clear from the above description that the seat for gasket 15 and gasket 15 itself may have a cross sectional shape different from the disclosed one, provided that said gasket 15 resiliently contrasts the approaching of said piston parts 13a, 13b and provided that the same gasket, when submitted to a compression sufficient to cause its deformation, can expand outside piston 11, towards the wall of infusion chamber 27.

Figure 4:
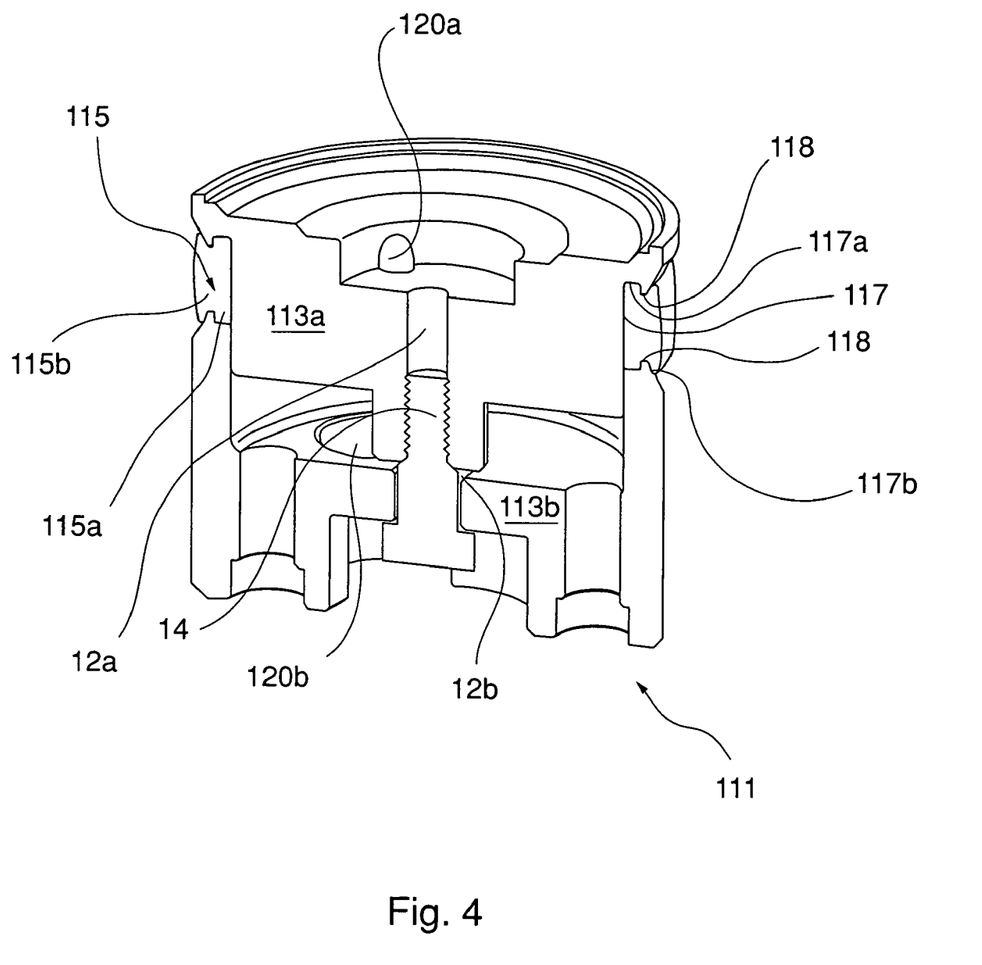
FIG. 4 is a perspective view of the piston shown in FIG. 3a, according to a variant embodiment.

In a variant embodiment of the invention, shown in FIG. 4, piston 111 has a seat 117 for gasket 115 between parts 113a, 113b. That seat has an internal zone 117a with a C-shaped profile and an external zone 117b with a rectangular trapezoidal profile joined along its minor side with the C-shaped section of said internal zone 117a. Two opposed circumferential projections 118 are moreover provided between said internal zone 117a and said external zone 117b, which projections axially extend between said two zones of seat 117 to keep said gasket 115 in said seat.

Correspondingly, said gasket 115 has an internal portion 115a housed in said internal zone 117a of said seat 117, and an external portion 115b housed in said external zone 117b of said seat 117. The latter portion 115b can freely radially expand outside said seat 117 when said gasket 115 is axially compressed.

Advantageously moreover, said external portion 115b of said gasket 115 has a convex surface to improve tightness against internal wall 25 of infusion chamber 27.

The piston shown in FIG. 4 is an infusion piston, i. e. it is equipped with an axial duct 120a, 120b allowing the passage of liquid, usually water, intended for beverage infusion. Similarly, the illustrated piston could even be employed as a contrasting piston in which axial duct 120a, 120b is intended to allow the passage of the beverage, e.g. espresso coffee, obtained as a result of the infusion.

The piston according to the invention could even be a blind piston, i.e. without the duct for the passage of liquid, if such a duct is provided e.g. in the infusion chamber itself.

The piston according to the invention can be advantageously employed in coffee or other beverage making machines, equipped with either a horizontally or vertically developing infusion chamber. It can be used both in machines equipped with a stationary piston and a moving infusion chamber displacing relative to the piston, and in machines equipped with a stationary infusion chamber inside which a moving piston slides.

It is clear that the above description is given only by way of non limiting example and that changes and modifications are possible without departing from the scope of the invention, and that all changes and modifications suggested by the experience of the skilled in the art lie within the scope of the invention.

I claim:

1. A piston of an automatic machine for infusion of beverages, the piston being associated with a duct allowing the passage of liquid intended for infusion of said beverage and comprising:
    a piston head divided into two parts connected together and axially movable relative to each other so that said two piston parts are adapted to approach each other when an axially directed thrust is applied to said piston, and wherein said duct is an axial duct of said piston;
    an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and
    a circumferential seat for receiving said annular gasket formed between said two piston parts, wherein said seat includes;
        an internal zone having a C-shaped profile, intended to retain and axially compress said gasket,
        an external zone having a rectangular trapezoid profile joined along a minor side thereof with the C-shaped profile, and communicating with said internal zone and intended to allow the outward radial expansion of the gasket, and
        two opposed circumferential projections provided between said internal zone and said external zone, and axially extending to keep said gasket in said seat.

2. A piston as claimed in claim 1, wherein, when no axial thrust is applied to said piston, said gasket lies within a diameter of said two piston parts and, when an axial thrust is applied to said piston to cause said two piston parts to approach each other, said gasket projects outside said diameter.

3. A piston as claimed in claim 1, wherein said gasket has an internal portion housed in said internal zone of said seat, and an external portion that is housed in said external zone of said seat and that can freely radially expand outside said seat when said gasket is axially compressed.

4. A piston as claimed in claim 3, wherein said external portion of said gasket has a convex surface.

5. A piston of an automatic machine for infusion of beverages, the piston being associated with a duct allowing the passage of liquid intended for infusion of said beverage and comprising:
    a piston head divided into two parts connected together and axially movable relative to each other so that said two piston parts are adapted to approach each other when an axially directed thrust is applied to said piston, and wherein said duct is an axial duct of said piston;
    an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and
    a circumferential seat for receiving said annular gasket formed between said two piston parts, wherein said seat includes;
        an internal zone intended to retain and axially compress said gasket,
        an external zone communicating with said internal zone and intended to allow the outward radial expansion of the gasket;
    wherein said seat has a T-shaped section, and wherein the crossbar of the "T" corresponds with said internal zone and the stem of the "T" corresponds with the external zone.

6. A piston as claimed in claim 5, wherein said gasket has a T-shaped section, and wherein the internal portion, corresponding with the crossbar of the "T", is housed in said internal zone of said seat, and the external portion, corresponding with the stem of the "T", is housed in said external zone of said seat and can freely radially expand towards the outside of said seat when said gasket is axially compressed.

7. A piston as claimed in claim 1 or 5, wherein said two piston parts comprise a first, outer piston part intended to compress the powder for the infusion of said beverage, and a second, inner piston part, said second piston part comprising an axial cavity receiving a portion of said first piston part, said piston portion being slidable in said axial cavity when said two piston parts are made to slide relative to each other.

8. A piston as claimed in claim 1 or 5, wherein said two piston parts are always kept axially spaced apart during the operating cycle of the piston.

9. A piston as claimed in claim 1 or 5, wherein said piston is equipped with an axial duct allowing the passage of a beverage obtained as a result of the infusion.

10. A piston as claimed in claim 1 or 5, wherein said beverages to be infused is coffee.

11. An infusion assembly for an automatic machine for infusion of beverages, including coffee, comprising an infusion chamber and at least one piston co-operating with said chamber to compress inside it the powder from which said beverage is to be extracted by infusion of a liquid, said chamber and said piston being movable relative to each other, wherein said piston comprises a piston of an automatic machine for infusion of beverages, the piston being associated with a duct allowing the passage of liquid intended for infusion of said beverage and comprising:
    a piston head divided into two parts connected together and axially movable relative to each other so that said two piston parts are adapted to approach each other when an axially directed thrust is applied to said piston;
    an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and
    a circumferential seat for receiving said annular gasket formed between said two piston parts, wherein said seat includes;
        an internal zone having a C-shaped profile, intended to retain and axially compress said gasket, an external zone having a rectangular trapezoid profile joined along a minor side thereof with the C-shaped profile, and communicating with said internal zone and intended to allow the outward radial expansion of the gasket, and two opposed circumferential projections provided between said internal zone and said external zone, and axially extending to keep said gasket in said seat.

12. An infusion assembly as claimed in claim 11, wherein said annular gasket exerts a radial tightness against the internal wall of said chamber when an axial force is applied onto said piston to compress said powder, said axial force being sufficient to bring said two piston parts closer to each other.

13. An automatic machine for beverage infusion, comprising an infusion assembly provided with an infusion chamber and at least one piston co-operating with said chamber to compress inside it the powder from which said beverage is to be extracted by infusion of a liquid, said chamber and said piston being movable relative to each other, wherein said piston comprises a piston of an automatic machine for infusion of beverages, the piston being associated with a duct allowing the passage of liquid intended for infusion of said beverage and comprising:

a piston head divided into two parts connected together and axially movable relative to each other so that said two piston parts are adapted to approach each other when an axially directed thrust is applied to said piston;

an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and a circumferential seat for receiving said annular gasket formed between said two piston parts, wherein said seat includes;

an internal zone having a C-shaped profile, intended to retain and axially compress said gasket, an external zone having a rectangular trapezoid profile joined along a minor side thereof with the C-shaped profile, and communicating with said internal zone and intended to allow the outward radial expansion of the gasket, and two opposed circumferential projections provided between said internal zone and said external zone, and axially extending to keep said gasket in said seat.

14. A machine for beverage infusion as claimed in claim 13, wherein a beverage to be infused is coffee.

15. A method of obtaining radial tightness between a piston of a machine for beverage infusion and a corresponding infusion chamber wherein the piston is associated with a duct allowing the passage of liquid intended for infusion of said beverage, the method comprising the steps of:

providing in said piston a piston head divided into two parts connected together and axially movable relative to each other so that said two piston parts approach each other when an axially directed thrust is applied to said piston, and wherein said duct is an axial duct of said piston;

arranging between said two piston parts an annular gasket capable of radially expanding when an axially directed thrust making said two piston parts approach each other, is applied to said piston; and of keeping said two piston parts axially spaced apart as a result of elastic resistance of said annular gasket, when no axial thrust is applied onto the piston; and configuring between said two piston parts a circumferential seat for receiving said annular gasket, said seat including;

an internal zone intended to retain and axially compress said gasket, and an external zone intended to allow the outward radial expansion of the gasket;

wherein said step of configuring the seat comprises the step of configuring the internal zone with a C-shaped profile intended to retain and axially compress said gasket, and the external zone with a rectangular trapezoid profile joined along its minor side with the C-shaped section of said internal zone and intended to allow the outward radial expansion of the gasket.

16. A method of obtaining radial tightness between a piston of a machine for beverage infusion and a corresponding infusion chamber wherein the piston is associated with a duct allowing the passage of liquid intended for infusion of said beverage, the method comprising the steps of:

providing in said piston a piston head divided into two parts connected together and axially movable relative to each other so that said two piston parts approach each other when an axially directed thrust is applied to said piston, and wherein said duct is an axial duct of said piston;

arranging between said two piston parts an annular gasket capable of radially expanding when an axially directed thrust making said two piston parts approach each other, is applied to said piston; and of keeping said two piston parts axially spaced apart as a result of elastic resistance of said annular gasket, when no axial thrust is applied onto the piston; and configuring between said two piston parts a circumferential seat for receiving said annular gasket, said seat including;

an internal zone intended to retain and axially compress said gasket, and an external zone intended to allow the outward radial expansion of the gasket;

wherein said step of configuring the seat comprises the step of configuring a seat having a T-shaped section, the crossbar of the "T" corresponding with said internal zone and the stem of the "T" corresponding with the external zone.

17. An infusion assembly for an automatic machine for infusion of beverages, including coffee, comprising an infusion chamber and at least one piston co-operating with said chamber to compress inside it the powder from which said beverage is to be extracted by infusion of a liquid, said chamber and said piston being movable relative to each other, wherein said piston comprises a piston of an automatic machine for infusion of beverages, the piston being associated with a duct allowing the passage of liquid intended for infusion of said beverage and comprising:

a piston head divided into two parts connected together and axially movable relative to each other so that said two piston parts are adapted to approach each other when an axially directed thrust is applied to said piston;

an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and
a circumferential seat for receiving said annular gasket formed between said two piston parts, wherein said seat includes;
an internal zone intended to retain and axially compress said gasket,
an external zone communicating with said internal zone and intended to allow the outward radial expansion of the gasket;
wherein said seat has a T-shaped section, and wherein the crossbar of the "T" corresponds with said internal zone and the stem of the "T" corresponds with the external zone.

18. An infusion assembly as claimed in claim 17, wherein said annular gasket exerts a radial tightness against the internal wall of said chamber when an axial force is applied onto said piston to compress said powder, said axial force being sufficient to bring said two piston parts closer to each other.

19. An automatic machine for beverage infusion, comprising an infusion assembly provided with an infusion chamber and at least one piston co-operating with said chamber to compress inside it the powder from which said beverage is to be extracted by infusion of a liquid, said chamber and said piston being movable relative to each other, wherein said piston comprises a piston of an automatic machine for infusion of beverages, the piston being associated with a duct allowing the passage of liquid intended for infusion of said beverage and comprising:

a piston head divided into two parts connected together and axially movable relative to each other so that said two piston parts are adapted to approach each other when an axially directed thrust is applied to said piston;
an annular gasket housed between said two piston parts and radially expanding when an axially directed thrust is applied to said piston so as to make said two piston parts approach each other, the elastic resistance of said gasket keeping said two piston parts spaced apart when no axial thrust is applied onto the piston wherein said gasket ensures liquid tightness between said two piston parts both when said piston it is not submitted to an axial thrust, and when the piston is submitted to an axial thrust; and
a circumferential seat for receiving said annular gasket formed between said two piston parts, wherein said seat includes;
an internal zone intended to retain and axially compress said gasket,
an external zone communicating with said internal zone and intended to allow the outward radial expansion of the gasket;
wherein said seat has a T-shaped section, and wherein the crossbar of the "T" corresponds with said internal zone and the stem of the "T" corresponds with the external zone.

20. A machine for beverage infusion as claimed in claim 19, wherein a beverage to be infused is coffee.

* * * * *

UNITED STATES PATENT AND TRADEMARK OFFICE
CERTIFICATE OF CORRECTION

PATENT NO.        : 7,621,212 B2                              Page 1 of 1
APPLICATION NO.   : 11/023423
DATED             : November 24, 2009
INVENTOR(S)       : Carlo Carbonini It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Fourteenth Day of December, 2010

David J. Kappos
*Director of the United States Patent and Trademark Office*